United States Patent
Krokos et al.

[15] 3,691,963
[45] Sept. 19, 1972

[54] METHOD AND APPARATUS FOR SHIPPING MOTOR VEHICLES

[72] Inventors: Raymond M. Krokos, Detroit; William K. MacCurdy, Plymouth, both of Mich.

[73] Assignee: Evans Products Company

[22] Filed: May 14, 1970

[21] Appl. No.: 37,250

[52] U.S. Cl. ............ 105/368 R, 105/368 T, 214/152
[51] Int. Cl. ........................... B60p 7/08, B61d 45/00
[58] Field of Search...105/368 R, 368 T, 369 A, 368 S; 248/119 R, 361 A; 280/179 A; 214/152

[56] References Cited

UNITED STATES PATENTS

| | | |
|---|---|---|
| 3,362,353 | 1/1968 | Johnson et al.......... 105/368 S |
| 3,511,392 | 5/1970 | Blunden et al......... 105/368 R |
| 3,580,627 | 5/1971 | Underwood ........... 105/368 R |
| 2,118,364 | 5/1938 | Sheehan................. 105/368 T |
| 2,322,576 | 6/1943 | Huebshman et al.... 105/368 T |
| 3,465,691 | 9/1969 | Simmons................ 105/368 T |
| 3,507,471 | 4/1970 | Haynes, Jr. et al..... 105/368 T |
| 3,566,804 | 3/1971 | Mietla.................... 105/368 T |

Primary Examiner—Drayton E. Hoffman
Attorney—Harness, Dickey & Pierce

[57] ABSTRACT

A method and apparatus for loading and tying down motor vehicles onto a transporting railway car. Chains are fastened to the frame of the motor vehicle and two rigid members that are guided in a track. As the vehicles are moved along a loading ramp toward the railway car, the distance between the ends of the chains, in a vertical direction, is increased to tensioning the chains and tie down the vehicles.

8 Claims, 4 Drawing Figures

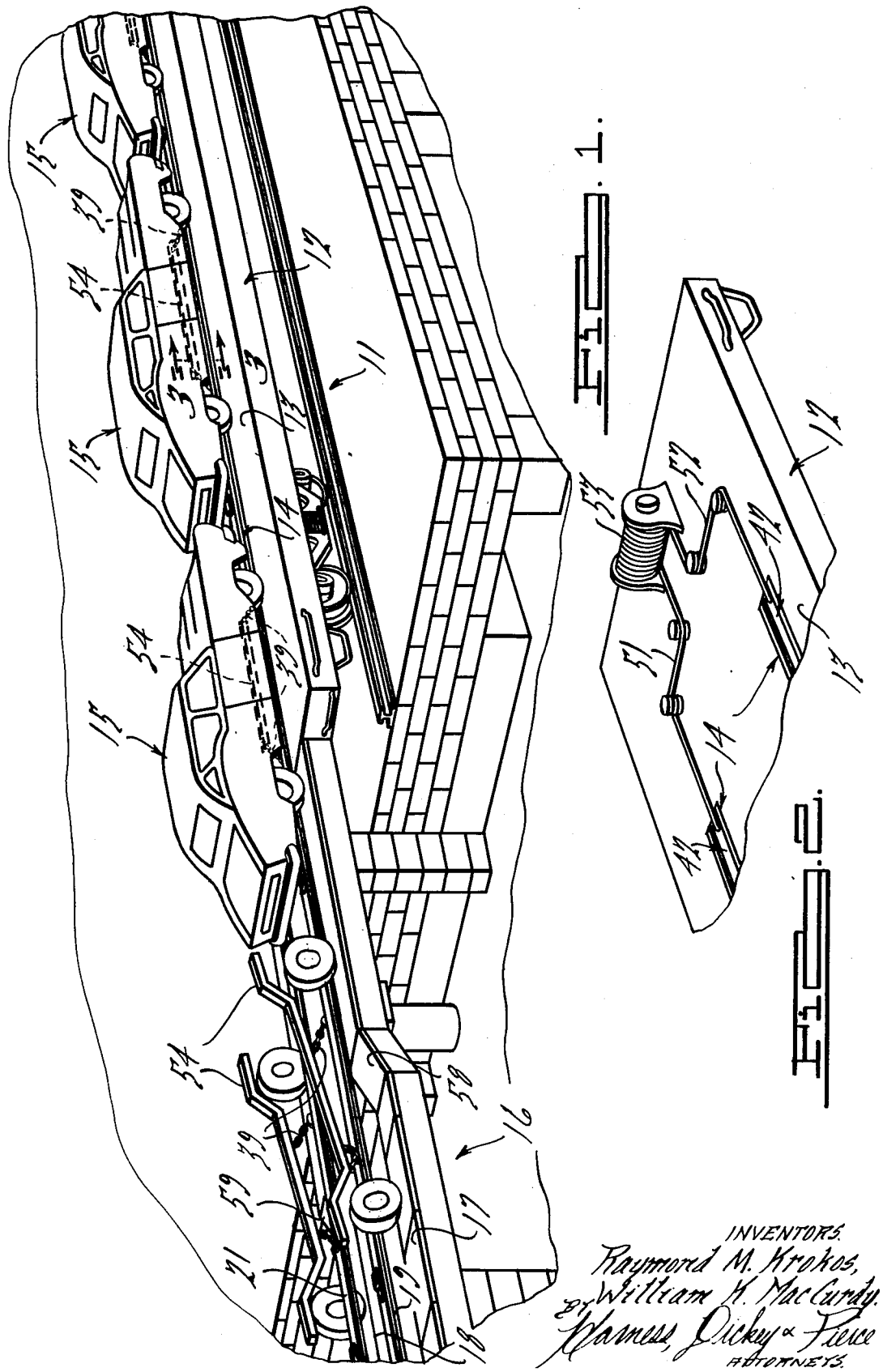

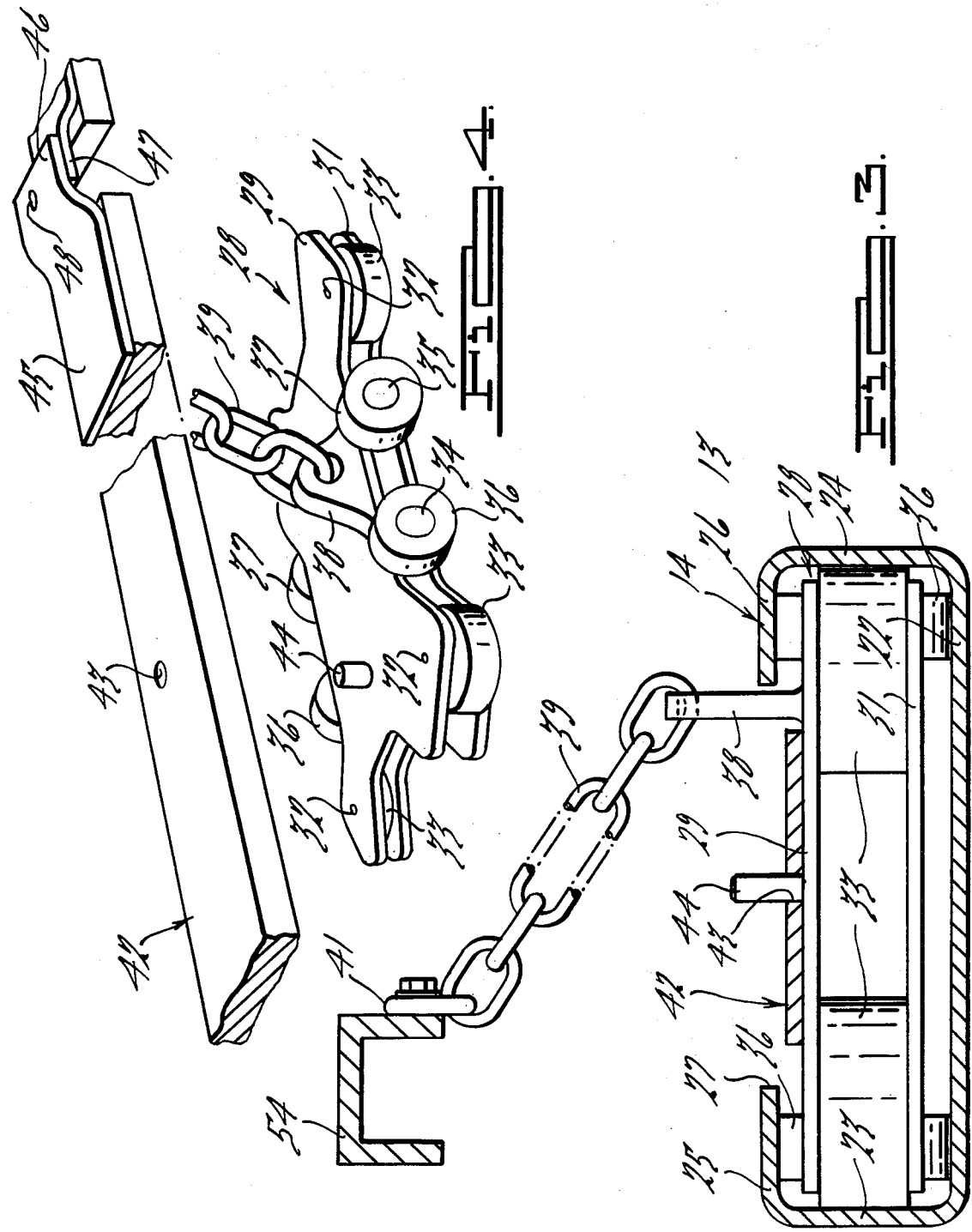

METHOD AND APPARATUS FOR SHIPPING MOTOR VEHICLES

BACKGROUND OF THE INVENTION

This invention relates to a method and apparatus for transporting motor vehicles and more particularly to an improved method and apparatus for loading motor vehicles onto a transporting vehicle and for tying the motor vehicles down to the transporting vehicle.

Motor vehicles are generally shipped from their point of assembly to the dealer by loading the vehicles onto a transporting haul-a-way trailer or specially constructed railway car. Frequently, both modes of transportation are used before the motor vehicle reaches its ultimate destination. In all commercial applications, the automobile or other motor vehicle is driven onto the transporting vehicle. Obviously, this is a time consuming operation and requires a relatively large amount of manpower. Once on the transporting vehicle, the motor vehicle must be tied down in some manner so as to prevent damage during shipment. This tying down is done by chains or other specially constructed tie down devices. It is essential that the chains be tensioned and special tools are frequently required for tensioning the chains. The previously proposed tie down methods are not only expensive and time consuming but also do not afford positive assurance that a given motor vehicle will be tied down properly during shipment.

It is, therefore, a principal object of this invention to provide an improved method and apparatus for shipping motor vehicles.

It is another object of the invention to provide an improved method and apparatus for tying down motor vehicles on a transporting vehicle.

It is a further object of the invention to provide a method and apparatus for automatically tying down a motor vehicle as it is loaded onto a transporting vehicle.

It is still another object of the invention to provide an improved method and apparatus for loading motor vehicles onto a transporting vehicle.

SUMMARY OF THE INVENTION

This invention is particularly adapted to be embodied in a method for tying down motor vehicles for shipment on a transporting vehicle. The method comprises the step of affixing one end of a substantially inextensible member to the motor vehicle. The motor vehicle and the other end of the inextensible member are then moved in one direction relative to the transporting vehicle for positioning the motor vehicle for transit on the transporting vehicle and simultaneously the ends of the inextensible member are moved away from each other in a direction normal to the one direction for tensioning the inextensible member and tying down the motor vehicle.

The invention is also adapted to be embodied in an apparatus for performing the aforenoted method. Such an apparatus includes an inextensible member that is adapted to be connected in one end to the motor vehicle and which is connected at its other end to a member that is supported for movement within a track. The track extends in the one direction and also diverges from the floor along which the motor vehicle moves for tensioning the inextensible member.

BRIEF DESCRIPTION OF THE DRAWINGS

FIG. 1 is a perspective view showing a method and apparatus for loading and tying down motor vehicles onto a transporting vehicle.

FIG. 2 is a perspective view showing the forward portion of the railway car shown in FIG. 1.

FIG. 3 is an enlarged cross-sectional view showing the tie down mechanism and is taken generally along the line 3—3 in FIG. 1.

FIG. 4 is an enlarged, exploded perspective view of the tie down shown in FIG. 3.

DETAILED DESCRIPTION OF THE PREFERRED EMBODIMENT

FIG. 1 is a view which may be considered as being taken at the loading dock of an automobile assembly plant. This loading dock provides a siding, indicated generally by the reference numeral 11 on which a transporting railway car 12 is positioned. The railway car 12 has a deck 13 in which spaced apart generally channel shaped guides 14 are positioned. Although a single level railway car 12 is depicted, it should be understood that this invention is susceptible for use in connection with multi-level cars and that loading ramp, to be described, can be juxtaposed to each level of the car. For the simplicity of illustration, however, only one level is depicted.

A plurality of motor vehicles, in this case automobiles, indicated generally by the reference numeral 15, are adapted to be loaded onto and tied down to the car 12 in a manner which will become more apparent as this description proceeds.

Automobiles 15 are delivered to the car 12 by means of a loading ramp, indicated generally by the reference numeral 16, which loading ramp is juxtaposed to the siding 11. The loading ramp 16 is elevated so as a workman may stand underneath a pair of spaced apart tracks 17 and 18 of the loading ramp. The tracks 17 and 18 may extend directly from the end of the assembly line (not shown).

Supported above the tracks 17 and 18 and in line with the guide channels 14 of the car 12 are a pair of similarly shaped guide channels 19 and 21. The guide channels 14, 19 and 21 are the same in construction and this construction will now be described by particular reference to FIG. 3, which is typical. Each of the guide channels has an elongated base leg 22 and upstanding side legs 23 and 24. Horizontally disposed flanges 25 and 26 extend inwardly from the upper end of the legs 23 and 24 and define an opening 27.

Tie down members, indicated generally by the reference numeral 28, are provided for tying down the automobiles 15 onto the car 12. These tie down members 28 may best be understood by reference to FIGS. 3 and 4 and include a tie down fitting comprised of a pair of spaced apart plates 29 and 31 that are affixed together in any suitable manner including vertically extending pins 32 positioned at the four corners of the plates 29 and 31. The pins 32 rotatably support guide rollers 33. Intermediate the ends of the plates 29 and 31, a pair of horizontally extending shafts 34 and 35 are positioned. Pairs of guide rollers 36 and 37 are journaled on the outer ends of the shafts 34 and 35, respectively. Between the guide rollers 36 and 37 at one side of the plate 29, an upstanding lug 38 is formed. A chain 39 is fixed at one end to the lug 38. The other end of the chain 39 has a fitting 41 that is adapted to be affixed to the motor vehicle 15 in a manner which will become more apparent as this description proceeds.

The tie down member 28 is adapted to be positioned in the guide channels 19 and 21 through an opening (not shown) provided at one end of these channels. When so inserted, the guide rollers 33 engage the upstanding legs 23 and 24 and the pairs of guide rollers 36 and 37 are trapped between the lower leg 22 and the flanges 25 and 26 of the guide channels 19 and 21. Thus, one end of the chain 39 is fixed for movement along the respective guide channels 19 and 21 and into the car supported guide channels 14.

A plurality of elongated loading members in the form of metal plates, indicated generally by the reference numeral 42, are also adapted to be loosely received within the guide channels 19, 21 and 14. In the depicted embodiment, two loading members 42 are employed for each automobile 15, one at each side of the automobile. The loading members 42 are formed with at least one pair of spaced apertures 43, each of which is adapted to receive a pin 44 formed on the upper plate 29 of the tie down member 28. When so received, one of the ends of the chains 39 is fixed in a preselected longitudinal position. Similarly, the spacing between like ends of the chains 39 is determined.

The forward end of each loading member 42 is bifurcated by affixing a plate 45 to its upper side. The plate 45 has an offset portion 46 that is adapted to receive an offset end 47 of a plate that is fixed to the trailing end of each loading member 42. The offset portions 46 and 47 are apertured and receive a pin 48 for connecting the loading members 42 to each other in a series.

The method of loading and tying the cars will now be described by specific reference to FIGS. 1 and 2. These figures show a plurality of automobiles 15 already loaded onto the car 12. To initiate the loading procedure, however, pairs of tie down members 29 are positioned at the loading end of the guide channels 19 and 21 and a loading member 42 is positioned over each pair of tie down members 28 to affix their longitudinal relationship as aforenoted. At this time, the fittings 41 at the outer ends of the chains 39 will hang loose. A pair of elongated cables 51 and 52 are connected at one of their ends to the forward end of the loading members 42 through the aperture that receives the pin 48. The opposite ends of the cables 51 and 52 are connected to a winch 53 that is supported at the forward end of the car 12. This winch may be power or manually driven, preferably the former. It will be readily apparent to those skilled in the art that other methods than the winch 53 and the cables 51 and 52 may be employed for moving the loading members 42 onto the car 12.

As an automobile 15 is positioned on the tracks 17 and 18, an operator standing under these tracks attaches the fittings 41 to the side frame rails 54 of the automobile 15. A large portion of the automobile at the extreme lefthand side of FIG. 1 has been removed to show the connection of the ends of the chains 39 to the frame rails 54. When so connected to the automobile 15, the movement of the loading members 42 along the guide channels 19 and 21 will draw the automobiles 15 toward the car 12. At this stage, the vertical distance between the tracks 17 and 18 and the guide channels 19 and 21 is less than the length of the chains 39.

It is to be understood that after one automobile 15 is connected to one pair of loading members 42 another pair of loading members 42 is connected to the first pair by the pins 48 and another automobile 15 is attached through the tie down fittings 28 in the manner previously described. A sufficient number of pairs of loading members 42 are employed so as to fully load the railway car 12.

As the loading members 42 and attached automobile 15 approach the railway car 12, the tracks 17 and 18 reach kick up sections 58 and 59. Previously, the tracks 17 and 18 were at a lower level than the level of the railway car floor 13. The kick up sections 58 and 59, however, raise these tracks to the level of the car floor 13. As the wheels of the automobiles 15 go up the kick up sections 58 and 59, the fittings 41 and one end of the chains 39 will move vertically away from the end of the chain that is connected to the plate 29. Since the plate 29 is trapped within the guide channels 19 and 21, which remain at a constant height, a tension will be put on the chains 39 tending to pull the frame rails 54 down towards the car floor 13. As so tensioned, the automobile 15 and loading members 42 move along the length of the tracks 17 and 18 and finally onto the car 13. This movement is continued until the car 12 is fully loaded. At this time, the exposed ends of the loading members 42 at opposite ends of the car 12 may be nailed down or otherwise secured to the car 12.

Thus, the automobiles 15 are loaded onto the car 12 and are simultaneously tied down to the car 12 by the tensioning of the chains 39. This insures that each automobile 15 that is loaded onto the car 12 will be securely tied down. The manpower required to load the car 12 is, obviously, considerably reduced.

It has been previously noted that other methods may be employed for delivering the automobiles 15 and loading members 42 onto the railway car 12. In addition, in this embodiment the automobiles 15 are elevated as they are moved toward the car 12 and the opposite ends of the chains 39 are held against any vertical movement. It should be readily apparent that the opposite condition may exist. That is, the guide channels 19 and 21 may diverge downwardly toward the tracks 17 and 18 and the tracks may remain at a fixed elevation. Various other changes and modifications may be made without departing from the spirit and scope of the invention but defined by the appended claims.

What is claimed is:

1. A method of tying down a motor vehicle for shipment on a transporting vehicle employing a substantially inextensible member having means at one end for providing an operative, detachable connection to the motor vehicle and means at its other end for providing an operative connection to the transporting vehicle, comprising the step of affixing the one end of the substantially inextensible member to the motor vehicle and the step of moving the motor vehicle and the other end of the inextensible member in one direction relative to the transporting vehicle for positioning the motor vehicle for transport on the transporting vehicle and simultaneously moving the ends of the inextensible member away from each other in a direction normal to the one direction a distance sufficient to tension the inextensible member and tie down the motor vehicle upon the transporting vehicle by compressing the suspension springs of the motor vehicle.

2. A method as set forth in claim 1 wherein the other end of the inextensible member is moved in a fixed path.

3. A method as set forth in claim 1 wherein the one end of the inextensible member is moved in a fixed path which diverges from the path of the other end in the normal direction.

4. A method as set forth in claim 1 wherein the motor vehicle is moved along a path that raises relative to the path of movement of the other end of the inextensible member for tensioning the inextensible member.

5. A method as set forth in claim 1 as applied to transporting a plurality of motor vehicles in end to end relationship, comprising the steps of fixing a respective inextensible member at one end to each of the vehicles, and the step of operatively connecting the other ends of the inextensible members to each other for moving the motor vehicles onto the transporting vehicle.

6. A method as set forth in claim 1 wherein the inextensible member is tensioned prior to positioning of the motor vehicle upon the transporting vehicle.

7. An apparatus for tying down a motor vehicle for shipment on a transporting vehicle comprising at least one relatively inextensible member adapted to be affixed at one end thereof to the motor vehicle, guide means defining a fixed path for the other end of said inextensible member, and track means upon which the motor vehicle is adapted to be rolled and delivered to a transporting vehicle, said guide means and said track means diverging from each other along at least a portion of their lengths for tensioning said inextensible member.

8. An apparatus as set forth in claim 7 wherein the guide means comprises a channel in which the one end of the inextensible member is operatively received.

* * * * *